United States Patent [19]

Price

[11] 4,215,873
[45] Aug. 5, 1980

[54] METHOD AND MEANS FOR ATTACHING ACCESSORY FENDER TO AUTOMOTIVE VEHICLE

[75] Inventor: Harold Price, Glencoe, Ill.

[73] Assignee: G-P Manufacturing Co., Inc., Chicago, Ill.

[21] Appl. No.: 939,172

[22] Filed: Sep. 5, 1978

[51] Int. Cl.³ ............................................ B62D 25/16
[52] U.S. Cl. ........................ 280/153 R; 280/154.5 R; 24/3 J
[58] Field of Search ........... 280/152 R, 152 A, 152 B, 280/152.3, 153 R, 153 A, 153 B, 154, 154.5 R, 154.5 A; 293/112; 180/84; 24/3 J, 3 L, 81 AA, 101 B, 259 R, 265 A, 265 EC

[56] References Cited

U.S. PATENT DOCUMENTS 4,174,850  11/1979  Hart .................................. 280/153 R Primary Examiner—John J. Love
Assistant Examiner—Norman L. Stack
Attorney, Agent, or Firm—Arnstein, Gluck, Weitzenfeld & Minow

[57] ABSTRACT

An accessory fender is attached to the flange delineating the wheel opening of an automotive vehicle by a plurality of retainer clips having teeth struck out from confronting surfaces. The clips are merely driven over juxtaposed surfaces of the fender and flange and engage respective surfaces in such a manner as to resist withdrawal of the clip. The clip may be manually deflected to withdraw the teeth from the fender to permit separation of the fender from the flange.

3 Claims, 5 Drawing Figures

METHOD AND MEANS FOR ATTACHING ACCESSORY FENDER TO AUTOMOTIVE VEHICLE

FIELD OF THE INVENTION

The present invention relates to an improved method and means for attaching an accessory fender to an automotive vehicle.

BACKGROUND OF THE INVENTION

The use of accessory fenders on automotive vehicles, such as vans or recreational vehicles, is currently popular among the users of such vehicles. Such fender accessories are formed of tough extruded plastic material and, heretofore, have been attached to the vehicles by use of sheet metal screws or bolts. The manner of attachment requires a series of holes to be drilled in the laterally extending metal flange which is part of the vehicle body and which delineates each wheel opening in the vehicle body.

In order to provide sufficient clearance for accommodating an electric drill which is required to be used for drilling the holes, the vehicle wheels must first be removed, which requires jacking up the vehicle.

It is an object of the present invention to provide a method and means for attaching an accessory fender to a vehicle without the use of tools, such as a drill, and without the necessity for drilling a series of holes in the vehicle. Unless extra precautions are taken the drilling of holes in the metal body tends to initiate rusting of metal with attendant deterioration of the vehicle.

Another object of this invention is the provision of a method and means for attaching an accessory fender to a vehicle which permits the accessory fender to be removed from one vehicle and, if desired, transferred to another vehicle, without injury to either vehicle.

A further object of this invention is the provision of a method and means for attaching accessory fenders to a vehicle which require a minimum of skill and the use of very simple tools.

Other and further objects and advantages of this invention will become apparent from the following description when considered in connection with the accompanying drawings.

BRIEF DESCRIPTION OF A PREFERRED EMBODIMENT

Figure 1:
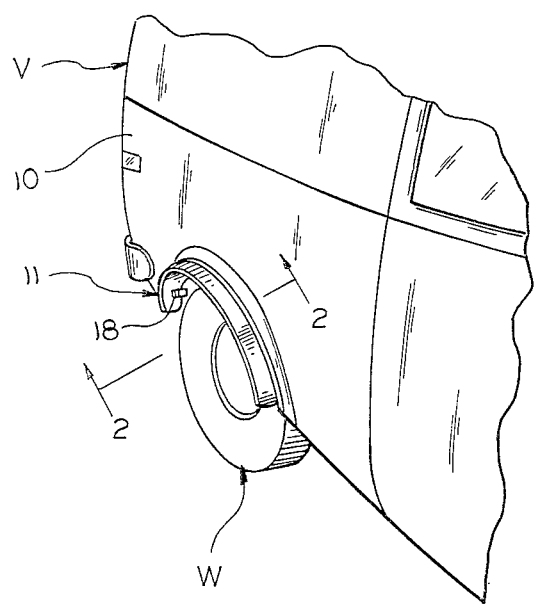
FIG. 1 is a fragmentary perspective view of a van type automotive vehicle showing a fender accessory attached thereto.

FIG. 1 shows a van type vehicle V having attached thereto an accessory fender 11. As seen clearly in FIG. 2, the body wall 10 of such a vehicle generally will have a lateral flange 12 defining the opening for each rear wheel W. In some instances the wall portion immediately adjacent the flange 12 may be offset from the plane of the body wall 10, as at 13. In any event, substantially all van type vehicles, at least, will have lateral flanges 12, as above described.

Figure 2:
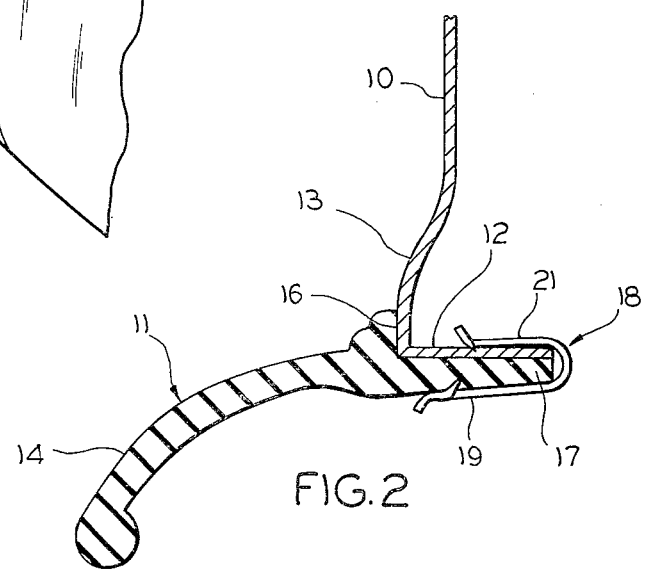
FIG. 2 is a cross sectional view, on an enlarged scale, taken substantially on lines 2—2 of FIG. 1.
Figure 3:
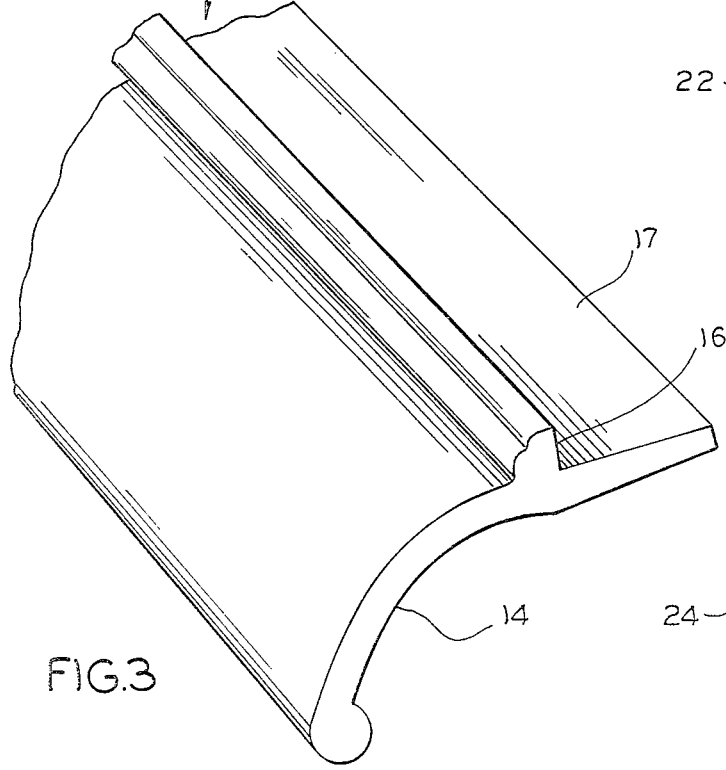
FIG. 3 is a fragmentary perspective view of a fender accessory intended for application to a van type vehicle.

Accessory fenders 11 of the type intended for attachment to a van type vehicle generally are formed of extruded tough plastic materials and substantially in the cross sectional configuration illustrated in FIGS. 2 and 3. As shown, the accessory fender 11 includes an arcuate outer portion 14 which when attached to the vehicle body extends generally laterally from the plane of the body and overhangs the wheel W. The accessory fender 11 includes a longitudinally extending integral shoulder 16 and an integral attaching inner strip 17 which preferably is tapered in cross section and which has substantially the same width as the flange 12.

As shown clearly in FIG. 2, the accessory fender 11 is intended to be applied to the vehicle body 10 with the inner strip 17 contiguous to the underside of the flange 12 and with the shoulder 16 abutting the wall 13 of the vehicle body.

Heretofore, it had been the practice to drill holes through both the inner strip 17 and the flange 11 and utilize suitable fastening elements, such as sheet metal screws or bolts, to effect securement of the accessory fender to the flange.

Figure 4:
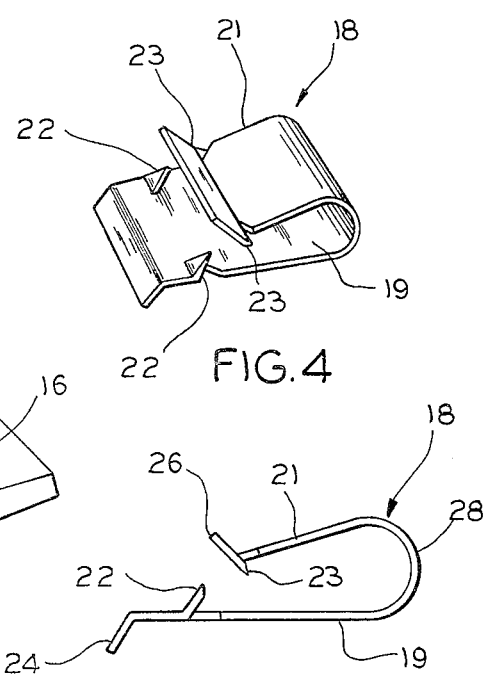
FIG. 4 is a perspective view of a retainer clip constituting the attachment means for the fender accessory.
Figure 5:
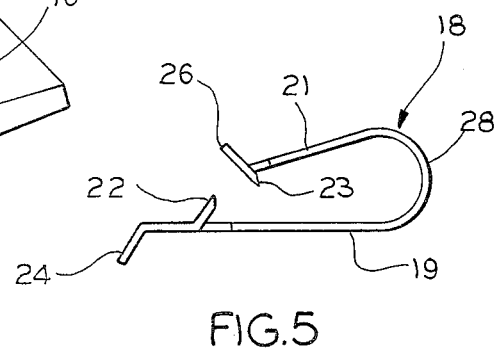
FIG. 5 is side elevational view of the retainer clip shown in FIG. 4.

In accordance with my invention I utilize a retainer clip 18 of the type illustrated in FIGS. 4 and 5 for securing the accessory fender 11 to the flange 12 of the vehicle. The retainer clip 18 is formed preferably of spring steel bent into a generally U-shaped configuration, with one leg 19 being slightly longer than the other leg 21. Pairs of teeth 22 and 23 are struck out from each of the confronting surfaces of the legs 19 and 21 and are formed in a manner to receive the flange 12 and inner strip 17 of the accessory fender, but to engage the respective surfaces thereof to resist withdrawal. The legs 19 and 21 terminate in outwardly inclined directed ends 24 and 26, respectively, for facilitating the insertion of the flange 12 and inner strip 17 therebetween. A bight portion 28 serves to limit the depth of insertion and provides an abutment against which force may be applied for forcing the toothed surfaces over the parts to be assembled.

In installation, the parts may be assembled by abutting the accessory fender 11 against the body wall 10, in the manner illustrated in FIG. 2, and applying force to the bight portion 28 to drive the retainer clip 18 over the respective surfaces to assume the position illustrated. It will be understood that a plurality of retainer clips spaced approximately two inches apart are desirable to secure the fender to the flange. When installed, the teeth 22 and 23 engage the respective surfaces in such a manner as to resist withdrawal of the clip 18. Once engaged by the teeth 22 and 23, the fender 11 may not be removed from the flange 12 until the leg 19 is manually deflected to withdraw the teeth 22 from the inner strip 17 of the fender. The leg 19 may be deflected by grasping the inclined end 24, as with pliers, or by inserting a tool, such as a screwdriver, against the end 24 to pry the leg 19 away from the fender.

It will now be seen that with the present invention an accessory fender may be secured to a body flange of a vehicle without the need for special tools and without the need for drilling a plurality of holes, and which facilitates separation of juxtaposed elements.

Various changes coming within the spirit of my invention may suggest themselves to those skilled in the art; hence I do not wish to be limited to the specific embodiments shown and described or uses mentioned, but intend the same to be merely exemplary, the scope of my invention being limited only by the appended claims.

I claim

1. In combination with a vehicle having a lateral metal flange delineating a wheel opening in the body of the vehicle, an accessory fender formed of flexible resilient material comformable to the contour of the flange and having a marginal strip portion contiguous to the underside of said flange, and a plurality of resilient retainer clips, each said retainer clip being formed of spring steel bent into a generally U-shaped configuration having a pair of legs connected by a bight portion with one of said legs being longer than the other, and each leg having at least two teeth extending angularly outwardly of the plane of the leg and in the direction of the opposite leg, each retainer clip being adapted to be forcibly applied at spaced points to the marginal strip portion of said flange by applying force on the bight portion to drive the clip so that the teeth of one leg engage in the metal flange and the teeth of the other leg engage in the marginal strip portion so as to secure said accessory fender to said flange.

2. The method of attaching an accessory fender formed of resilient material and having a marginal strip portion to the metal flange of an automotive vehicle delineating the wheel opening of the vehicle, the steps comprising abutting the upper face of said marginal strip against the underside of said metal flange, providing a plurality of spring steel clips each bent into a generally U-shaped configuration and having a pair of legs connected by a bight portion with one leg being longer than the other and each leg having at least two teeth extending angularly outwardly of the plane of the leg and in the direction of the opposite leg, and applying force to the bight portion of each clip to cause the same to embrace a portion of said marginal strip portion and metal flange whereby the teeth of one leg engage in the metal flange and the teeth of the other leg engage in the marginal strip portion to secure said accessory fender to said metal flange.

3. The invention as defined in claim 1 in which each leg of said retainer clip includes an angularly directed end edge for facilitating the insertion of said marginal strip portion and said flange between said legs, at least one of said legs being deflectable to effect disengagement of the associated teeth from an adjacent surface.

* * * * *